United States Patent [19]

Foster

[11] Patent Number: 5,255,712
[45] Date of Patent: Oct. 26, 1993

[54] CHECK VALVE PULL ASSEMBLY

[76] Inventor: Raymond K. Foster, P.O. Box 1, Madras, Oreg. 97741

[21] Appl. No.: 967,752

[22] Filed: Oct. 28, 1992

[51] Int. Cl.$^5$ .............................................. F16K 15/18
[52] U.S. Cl. ................................ 137/522; 137/630.15
[58] Field of Search ................. 137/522, 523, 630.15

[56] References Cited

U.S. PATENT DOCUMENTS

| | | | |
|---|---|---|---|
| 2,568,982 | 9/1951 | Bertea | 137/630.15 |
| 3,631,887 | 1/1972 | Schlechtriem | 137/522 |
| 4,466,336 | 8/1984 | Broome | 137/630.15 X |

Primary Examiner—Robert G. Nilson
Attorney, Agent, or Firm—Joan H. Pauly

[57] ABSTRACT

A primary valve orifice (26) divides a check valve cavity into first and second portions (4, 6). A valve member (34) closes the orifice (26) in response to higher pressure in the first portion (4) and is unseated to open orifice (26) in response to higher pressure in the second portion (6). An axial passageway (44) extends through the valve member (34). A control rod (50) extends into the cavity (4, 6) and through the passageway (44). The rod (50) carries a secondary valve plug (52) that is biased by a spring (60) to close one end of the passageway (44), and a pull block (78) that engages the opposite end of the valve member (34). A stem (40) extends from the valve plug portion (36) of the valve member (34) through the orifice (26) and is telescopically received in a sleeve (62). The control rod (50) is pulled to cause the secondary valve plug (52) to unseat and the pull block (78) to engage the sleeve (62). This opens the passageway (44) to equalize pressure on the two ends of the valve member (34). Further movement of the control rod (50) moves the valve member (34) and sleeve (62) as a unit to open the orifice (26). The sleeve (62) may be omitted, with the pull block (78) directly engaging the valve member (34).

10 Claims, 4 Drawing Sheets

CHECK VALVE PULL ASSEMBLY

TECHNICAL FIELD

This invention relates to pull assemblies for mechanically opening fluid operated check valves and, more particularly, to such an assembly that includes a passageway communicating opposite ends of the valve plug. The passageway is blocked by a closure surface carried by a control member that is pulled mechanically to open the passageway to equalize pressure on the two ends of the valve plug to thereby reduce the force required to unseat the valve plug.

BACKGROUND INFORMATION

A check valve is generally defined as a valve that permits flow in one direction but prevents flow in a return direction. One type of check valve has a housing that defines an axially extending cavity divided by a valve orifice into a first portion and a second portion. The two portions communicate with first and second ports, respectively. A valve member is urged against a seat surrounding the orifice by fluid pressure in the first port and moved away from the seat by fluid pressure in the second port. In some circumstances, it is desirable to provide a means for mechanically opening the valve when the pressure in the first port is higher than the pressure in the second port. A simple way of accomplishing this is to provide a control member that engages the valve member and can be pulled to mechanically move the valve member away from the seat. A problem that arises in connection with this type of arrangement is that a high level of force is required to overcome the pressure differential between the two ports and unseat the valve member. The high level of force, in turn, requires that the control member be heavy duty so that it is capable of carrying the required force.

SUMMARY OF THE INVENTION

The present invention addresses the problems mentioned above by providing a substantial equalization of pressure on the two ends of the valve member upon initial movement of the control member to reduce the force required to unseat the valve member.

A subject of the invention is an improvement in a check valve of the type described above. According to an aspect of the invention, the improvement comprises a passageway communicating the first and second portions of the valve cavity, a closure surface carried by the control member, and a spring. The spring normally biases the closure surface to close the passageway. The control member is movable to move the closure surface to open the passageway and thereby allow pressure on opposite ends of the valve member to substantially equalize, to facilitate movement of the valve member away from the seat in response to continued movement of the control member.

In a first preferred embodiment, the valve further comprises a sleeve slidably received in the second portion of the cavity. The sleeve has an end opening that faces the valve orifice and telescopically receives an end portion of the valve member. The sleeve also has a pressure surface that faces away from the orifice and is in communication with the passageway when the passageway is open. The control member engages the sleeve to move the sleeve and the valve member as a unit.

According to another aspect of the invention, the improvement comprises an axial passageway through the valve member. The passageway has a predetermined length and includes opposite ends. The control member extends through the passageway. The improvement also includes a secondary valve plug, a pull block, and a spring. The secondary valve plug and the pull block are carried by the control member. They are spaced apart a distance greater than the passageway length and are adjacent to the opposite ends of the passageway, respectively. The spring normally biases the valve plug against the valve member to close the passageway. The control member is movable to move the valve plug away from the valve member to open the passageway. This allows pressure on opposite ends of the valve member to substantially equalize, to facilitate movement of the valve member away from the seat in response to continued movement of the control member and accompanying engagement of the valve member by the pull block.

In its currently most preferred form, the valve also includes a sleeve slidably received in the cavity. The valve member includes a primary valve plug and a stem extending axially from the primary valve plug through the orifice. The stem terminates in a tubular end portion distal the primary valve plug. The sleeve has an end opening that faces the orifice and telescopically receives the end portion of the stem. A pressure surface on the sleeve faces away from the orifice and is in communication with the passageway when the passageway is open. The pull block is positioned to engage the sleeve, upon movement of the control member, to move the sleeve and the valve member, as a unit, upon further movement of the control member.

The sleeve may have various configurations. A preferred feature of the sleeve is an end socket directed away from the orifice and including an inner shoulder. The pull block is received in the end socket and is positioned to engage the inner shoulder. Another preferred feature is an end opening in the form of an end socket terminating in a shoulder that engages the end portion of the stem to move the primary valve plug away from the seat in response to further movement of the control member. In the preferred embodiment of the invention, the sleeve includes both of these oppositely directed end sockets.

In its preferred form, the spring surrounds the control member and has a first end urged against the secondary valve plug and an opposite end urged against a fixed support. The spring normally biases the secondary valve plug against the valve member to close the passageway and the valve member against the seat to close the orifice. The sleeve is preferably received into the cavity with sufficient clearance to allow the spring to move the valve member to close the orifice, upon release of a pulling force on the control member and seating of said secondary valve plug against said valve member.

The present invention solves the problems discussed above of the need for a large force to mechanically open a check valve against the force of a pressure differential and the related need for a relatively heavy control member for actuating the mechanical movement. In the valve of the invention, the pressure on the opposite ends of the main valve member is substantially equalized before the control member begins to move the valve member away from its seat. This allows the valve member to be unseated by a relatively small force. In embodiments having the spring biased valve plug described above, the required force is the relatively small force required to overcome the biasing action of the spring and any remaining pressure differential. Because this force is relatively small, the control member which engages the valve member to unseat it can be a lightweight member, such as a wire rod. The invention solves the problems of high required forces and heavy actuating members in a simple and cost effective manner. The invention achieves enhanced functioning of the valve while maintaining relative simplicity of the structure of the valve and ease and reliability of operation.

These and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

The drawings show two embodiments of an improved valve that are constructed in accordance with the invention and that constitute the best modes of the invention currently known to the applicant. The illustrated valves and other valves constructed in accordance with the invention may be used in various types of installations. One example of an installation in which the valve of the invention may be used to advantage is disclosed in the applicant's co-pending application Ser. No. 07/831,173, filed Feb. 5, 1992 and entitled "System of Linear Hydraulic Motors". In particular, the valve of the invention may be used to replace valves LV4, LV5, LV6 disclosed in the co-pending application.

Referring to FIGS. 1-9, the first preferred embodiment of the valve includes a housing 2 with a valve cavity 4, 6 formed therein. The cavity 4, 6 defines the longitudinal axis X of the valve. A primary valve orifice 26 divides the cavity 4, 6 into a first portion 4 and a second portion 6. One end 8 of the cavity is closed, and the opposite end has threads 9 formed thereon. An aluminum nut 10 with a hexagonal head threadedly engages the opposite end of the cavity 4, 6 to close the opposite end. An 0-ring 12 is provided to seal the nut head against the valve housing 2. A control member 50, described further below, extends axially through the nut 10 into the cavity 4, 6. A flexible plastic dust cover 14 engages the outer end of the nut 10. When the control member 50 is pulled, the cover 14 has a diaphragm action to keep dirt, water, and other foreign matter out of the valve. A nylon plastic wiper 16 is positioned around the control member 50 axially inwardly of the dust cover 14 to assist the cover 14 in keeping the valve components clean. Inwardly of the wiper 16 are a nylon washer 18, a high pressure seal 20, and an aluminum washer 24. Each of these three elements surrounds the control member 50. The nylon washer 18 functions as a wear bearing for the control member 50 and a backup for the seal 20. The seal 20 is a polypack-type seal for the control member 50 and is provided with a rubber expander 22.

Referring to FIGS. 1-5, the valve includes a first port 30 and a second axially spaced port 32 that communicate with the first and second portions 4, 6 of the cavity, respectively. A primary valve seat 28 surrounds the orifice 26. A valve member 34 is positioned in the cavity 4, 6 to be urged against the seat 28 and move away from the seat 28 in response to pressure differentials. The valve member 34 includes a primary valve plug 36 that is urged against the seat 28 by a higher pressure in the first port 30 than in the second port 32, to close off communication between the ports 30, 32. The valve plug 36 unseats when the pressure in the second port 32 is higher to allow movement of pressure from the second port 32 to the first port 30. The valve plug includes a closure surface 38 that contacts the seat 28 to close the orifice 26, and an opposite radial surface 48 that provides a secondary valve seat, as discussed further below.

The valve member 34 also includes a stem 40 that extends axially from the primary valve plug 36 through the orifice 26. The stem 40 terminates in a tubular end portion distal the primary valve plug 36. An axial passageway 44 extends through the valve member 34 from the radial surface 48 to the opposite radial end surface 42 at the end of the tubular end portion. The end 46 of the passageway 44 adjacent the radial surface 48 forms a secondary valve orifice.

Figure 2:
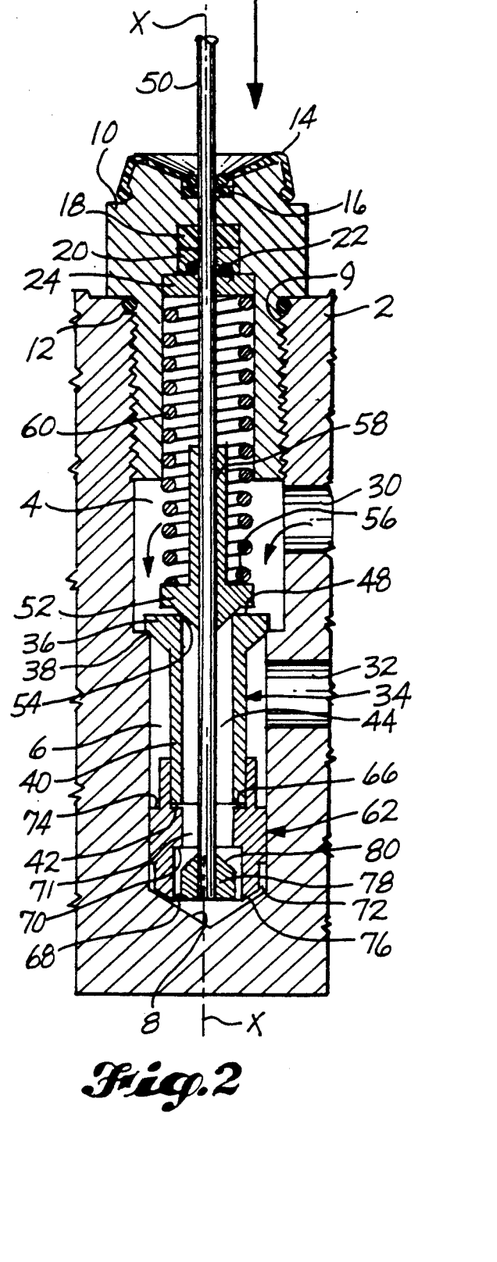
FIG. 2 is like FIG. 1 except that it shows the valve member seated by fluid pressure.

The control member 50, which is preferably a wire rod, extends through the passageway 44. A secondary valve plug 52 is carried by the control member 50 for normally closing the secondary valve orifice 46 formed by the end of the passageway 44. The plug 52 has a closure surface 54 that seatingly engages the surface 48 around the orifice 46, and an opposite radial surface 56 that provides a spring abutment. A sleeve portion 58 of the plug 52 extends axially from the abutment surface 56 and surrounds the control rod 50. A coil spring 60 surrounds the control rod 50 and the sleeve portion 58 of the plug 52. The spring 60 has a first end urged against the spring abutment 56 on the plug 52, and a second end urged against the aluminum washer 24, which provides a fixed support or abutment for the second spring end. The spring 60 biases the plug 52 into seating engagement with the seat 48 formed on the valve member 34, and also biases the valve plug portion 36 of the valve member 34 into seating engagement with the primary valve seat 28, as shown in FIG. 2.

The valve shown in FIGS. 1-9 is particularly well-suited as a replacement for the type of valve in which the stem portion of the valve member extends out of the valve housing, and the outer radial end surface of the stem is therefore isolated from fluid pressure tending to unseat the valve member. An important feature of the valve shown in FIGS. 1-9 is the maintenance of the effective pressure surface differential of the valve member when the valve is functioning as a check valve in response to fluid pressure, and the substantial elimination of the differential during the mechanical opening of the valve by the control member 50. This feature facilitates the mechanical opening of the valve without affecting the functioning of the valve in response to fluid pressure. The realization of this feature is preferably accomplished by providing the valve with a sleeve 62 that is slidably received in the second portion 6 of the cavity 4, 6. The sleeve 62 has oppositely oriented end sockets 64, 68. The first end socket 64 faces the primary valve orifice 26 and telescopically receives the tubular end portion of the stem 40 of the valve member 34. The socket 64 terminates in a shoulder 66 that engages the end surface 42 of the stem 40. The second end socket 68 is directed away from the orifice 26 and includes an inner shoulder 70. An axial opening 71 connects the two end sockets 64, 68 and forms an extension of the passageway 44 in the valve member 34. The outer end surface 76 of the sleeve 62 facing away from the orifice 26 and the shoulder 70 together act as a pressure surface for the unit formed by the valve member 34 and the sleeve 62. The effective area of the pressure surface 70, 76 substantially equals the area of the radial surface 48 of the primary valve plug 36 minus the small annular region at the periphery of the surface 48 which extends radially beyond the orifice 26. This annular region is cancelled by the area of surface 38 that extends radially beyond the orifice 26.

During mechanical opening of the valve, the control member 50 engages the valve member 34 to pull the valve plug portion 36 of the valve member 34 away from its seat 28. The control member 50 engages the valve member 34 by means of a pull block 78 which is carried by the control member 50 and is received in the second end socket 68 of the sleeve 62. The secondary valve plug 52 and the pull block 78 are spaced apart on the control member 50 a distance greater than the length of the extended passageway 44, 71. Both the valve plug 52 and the pull block 78 are firmly secured to the control member 50. Preferably, they are silver soldered to provide a very strong connection.

Figures 5, 6, 7, 8, 9:
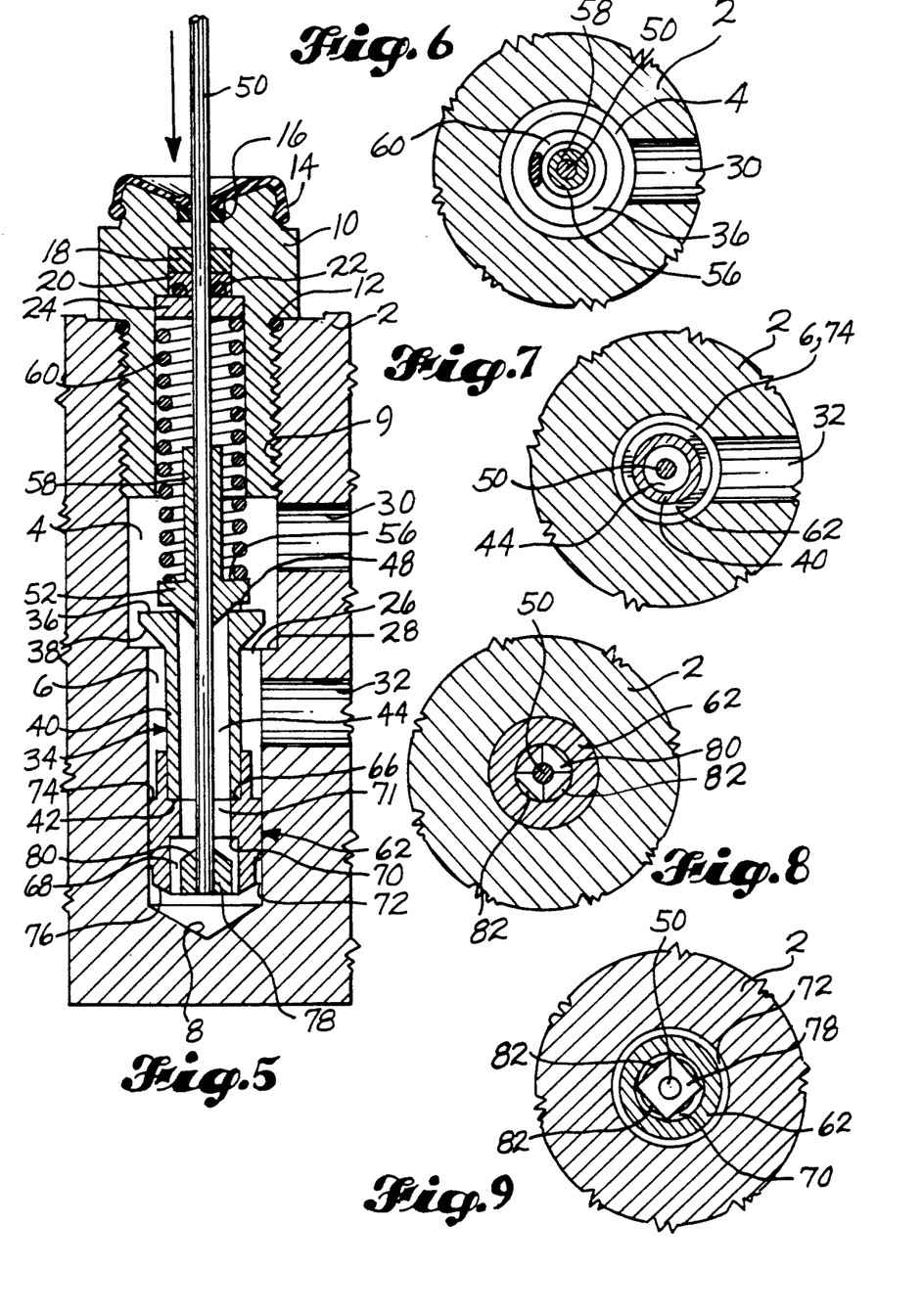
FIG. 5 is like FIG. 4 except that it shows the valve following release of the pulling force on the control member.
FIG. 6 is a cross-sectional view taken along the line 6—6 in FIG. 1.
FIG. 7 is a cross-sectional view taken along the line 7—7 in FIG. 1.
FIG. 8 is a cross-sectional view taken along the line 8—8 in FIG. 1.
FIG. 9 is a cross-sectional view taken along the line 9—9 in FIG. 1.

When the control member 50 is pulled, a tapered end 80 of the pull block 78 engages the shoulder 70 to pull the sleeve 62 and thereby pull the valve member 34. The pull block 78 has a square cross section, as shown in FIG. 9, to provide gaps 82 between the pull block 78 and the shoulder 70. The square cross-sectional configuration of the pull block 78 and the gaps 82 formed thereby allow the extended passageway 44, 73 to remain open as the valve member 34 and sleeve 62 are pulled as a unit by the control member 50.

Figure 1:
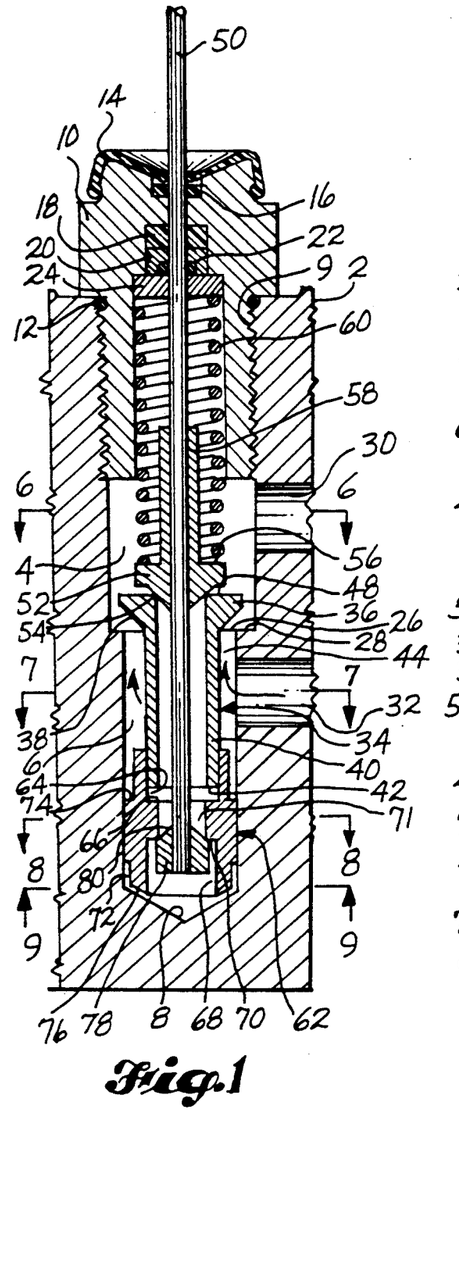
FIG. 1 is a sectional view of a first preferred embodiment of the valve showing the valve when the valve member is unseated by a pressure differential between the two ports.

The operation of the valve is illustrated in FIGS. 1-5. FIG. 1 shows the positions of the valve components when the valve member 34 is unseated by higher pressure in the second port 32 to allow pressure flow from the second port 32 to the first port 30. The valve member 34 and the secondary valve plug 52 have moved upwardly (as shown) so that the closure surface 38 no longer contacts the primary valve seat 28 and the orifice 26 is open. The two members 34, 52 move against the force of the spring 60, and the plug 52 remains seated on the end surface 48 of the valve member 34 to close the passageway 44. Since the valve member stem 40 is telescopically and slidably received in the sleeve 62, the sleeve 62 does not move, and the effective pressure surface area provided by the closure surface 38 of the primary valve plug 36 is unaffected by the presence of the sleeve 62 during this mode of operation.

FIG. 2 illustrates the operation of the valve when pressure is higher in the first port 30 than in the second port 32. The pressure differential firmly seats the primary valve plug 36 against the seat 28. The secondary valve plug 52 is maintained in seating engagement with the valve member 34 by the spring 60. This is illustrated by the arrow in the upper portion of FIG. 2.

Figure 3:
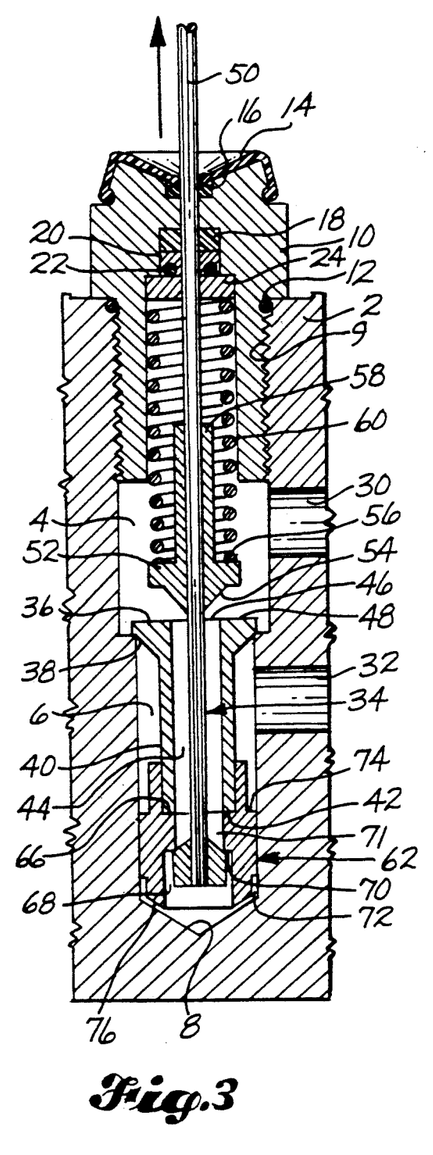
FIG. 3 is like FIGS. 1 and 2 except that it shows the valve with the control member moved an initial amount to open the passageway through the valve member.
Figure 4:
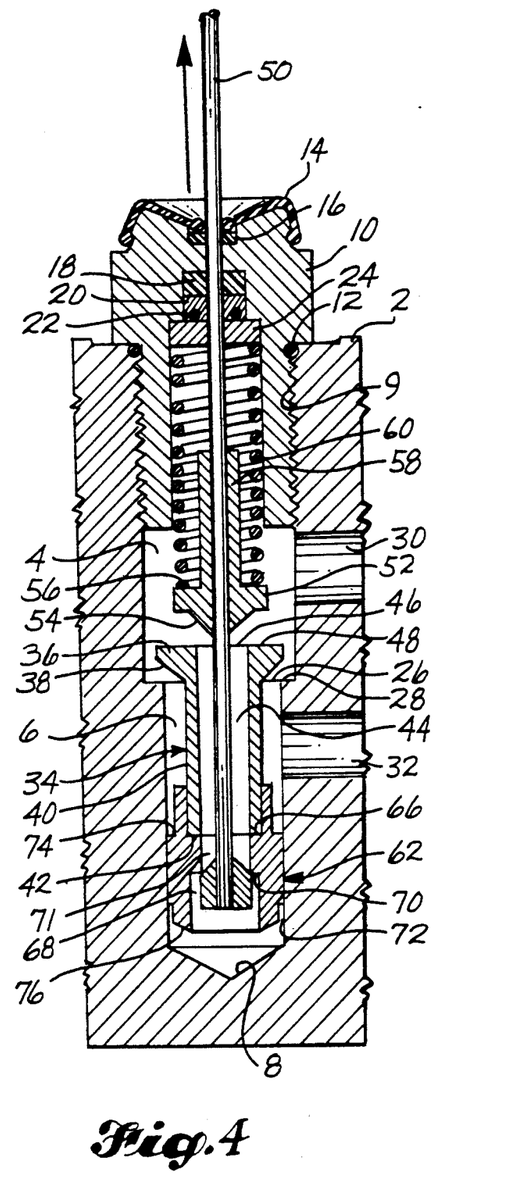
FIG. 4 is like FIG. 3 except that it shows the valve after further movement of the control member to unseat the valve member.

FIGS. 3-5 illustrate the manner in which movement of the control member 50 mechanically opens communication between the first and second ports 30, 32 when the pressure in the first port 30 is higher than that in the second port 32. The control member 50 may be moved by various means. The applicant's above-referenced co-pending application discloses one example of a mechanism that may be used to move the control member 50. Referring to FIG. 3, the initial movement of the control member 50 in the direction of the arrow (upper portion of FIG. 3) brings the tapered end 80 of the pull block 78 into engagement with the shoulder 70 on the sleeve 62. As the control member 50 moves to bring the pull block 78 into engagement with the sleeve 62, the secondary valve plug 52 moves out of seating engagement with the primary valve plug 36. This opens the passageway 44 through the valve member 34 to allow pressure movement from the first portion 4 of the cavity to the second portion 6 between the end of the sleeve 62 and the closed end 8 of the cavity 4, 6. The result is a substantial equalization of the pressure on the two ends of the valve unit formed by the valve member 34 and the sleeve 62.

Referring to FIG. 4, as the pull block 78 engages the sleeve 62, it also engages the valve member 34 via the sleeve 62. This is accomplished by the engagement of the end surface 42 of the valve member stem 40 by the sleeve shoulder 66. Once the pull block 78 has engaged the sleeve 62 and the valve member 34, further axial movement of the control member 50 in the direction of the arrow moves the valve member 34 and sleeve 62 as a unit to unseat the primary valve plug 36 from its seat 28. During the further movement of the control member 50, the gaps 82 around the pull block 78 maintain the axial passageway 44, 71 open to maintain the pressure equalization between the two opposite ends of the valve unit 34, 62. FIG. 4 shows the valve at approximately the point at which the control member 50 has completed its axial movement.

FIG. 5 illustrates the valve following the opening motion of the control member 50 and the release of the pulling force on the control member 50. Upon release of such force, the spring 60 exerts a force in the direction of the arrow shown in FIG. 5 to reseat the secondary valve plug 52 on the valve member 34 and then reseat the valve member 34 with the secondary valve plug 52 seated thereon. The valve returns to the position illustrated in FIG. 2. In order to permit the sleeve 62 to move back to its position shown in FIG. 2, fluid must move from between the end surface 76 of the sleeve 62 and the closed end 8 of the cavity 4, 6. Fluid movement occurs through the clearance between the circumferential surface of the sleeve 62 and the cavity sidewall. Very little clearance is necessary in order to accomplish this. Preferably, the clearance is in the order of 0.005 inch. An annular groove 72 is provided around the lower portion (as shown) of the circumferential surface of the sleeve 62 to facilitate escape of the fluid through the clearance. On the opposite end of the sleeve 62, a step 74 forms a reduced diameter portion into which the end of valve stem 40 is telescopically received. This reduced diameter portion further facilitates movement of fluid through the clearance. Once the valve components have fully returned to the positions shown in FIG. 2, the valve continues to operate as a check valve, as illustrated in FIGS. 1 and 2.

Figure 10:
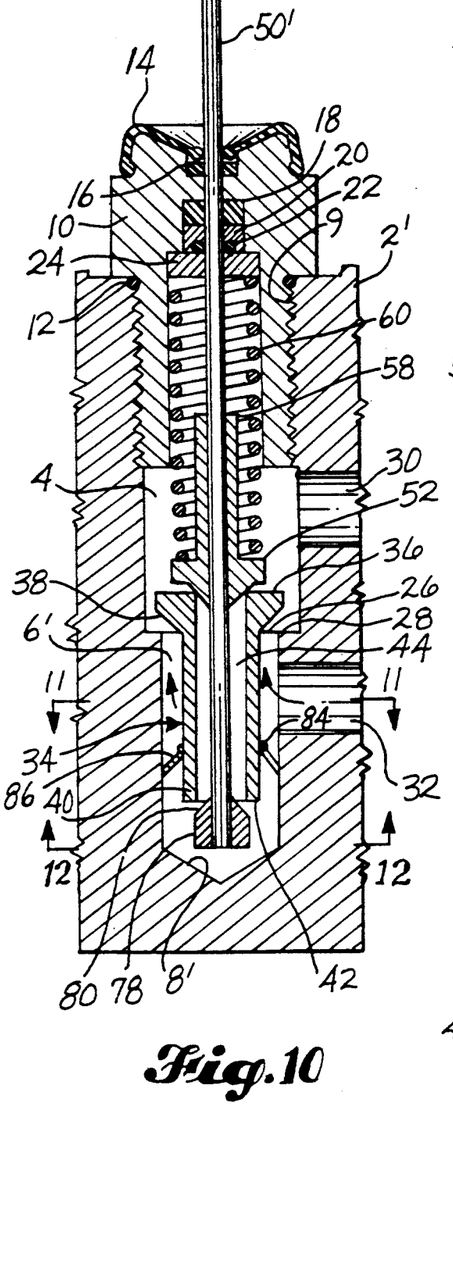
FIG. 10 is a sectional view like FIG. 1 but showing a second preferred embodiment of the valve.
Figure 11:
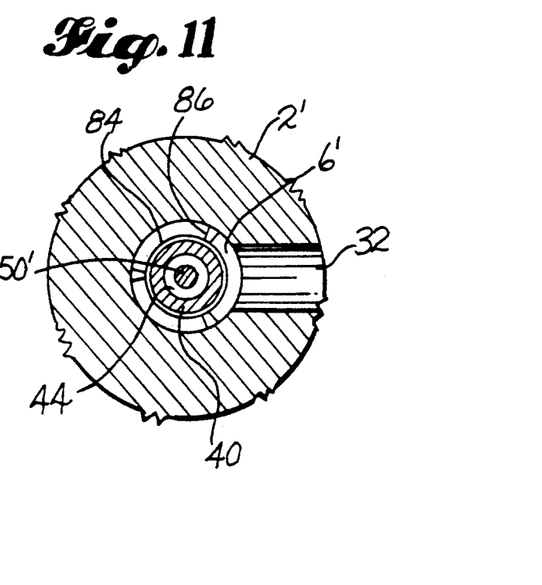
FIG. 11 is a cross-sectional view taken along the line 11-11 in FIG. 10.
Figure 12:
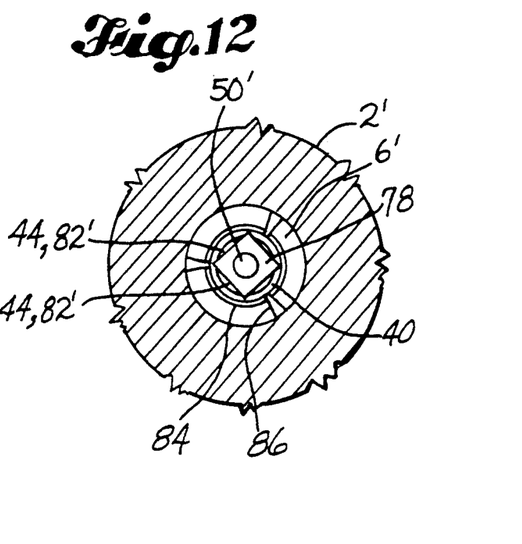
FIG. 12 is a cross-sectional view taken along the line 12—12 in FIG. 10.

A second preferred embodiment of the valve is shown in FIGS. 10-12. In this embodiment, the sleeve 62 of the embodiment of FIGS. 1-9 is eliminated. Most of the other elements of the valve are identical to the elements shown in FIGS. 1-9 and are indicated by the same reference numerals. The elements which are modified because of the absence of the sleeve are indicated by reference numerals that are the same as in FIGS. 1-9 except for the addition of the prime symbol. The modified elements include the valve housing 2' and the second portion of the valve cavity 6, and its closed end 8'. The valve housing 2' and the second cavity portion 6' are both shorter than the corresponding elements in FIGS. 1-9 since there is no need to provide room for the sleeve. Similarly, the control member ' is shorter because it directly engages the valve member 34, rather than indirectly engaging it via a sleeve. The gaps 82' are formed between the pull block 78 and the valve member stem 40, rather than between the pull block and a sleeve, as in FIGS. 1-9. The embodiment of FIGS. 10-12 has the additional element of a spider 84, 86, which engages the stem 40 of the valve member 34 to keep the stem 40 centered and guide its movement as the primary valve plug 36 moves between its seated and unseated positions. The spider 84, 86 comprises a center ring 84 that surrounds and slidably engages the stem 40, and a plurality of spokes 86 that support the ring 84.

The operation of the valve shown in FIGS. 10-12 is substantially the same as that of the valve shown in FIGS. 1-9. FIG. 10 corresponds to FIG. 1 and shows the positions of the valve components when the valve member 34 is unseated by higher pressure in the second port 32 than in the first port 30. The pressure in port 32 acts on the closure surface 38 of the valve plug 36 and the radial end surface 42 of the stem 40 to open the main orifice 26. Since the opening fluid pressure acts on the radial end surface 42 as well as the closure surface 38, the pressure differential between the two ports 30, 32 required to unseat the primary valve plug 36 in this embodiment is less than the differential required in the embodiment of FIGS. 1-9.

When the control member 50' is moved to mechanically unseat the primary valve plug 36, initial upward (as shown) movement of the control member 50' brings the tapered end 80 of the pull block 78 into engagement with the radial end surface 42 of the valve member stem 40 and unseats the secondary valve plug 52 from the upper end of the passageway 44. This allows the pressure on the opposite ends of the valve member 34 to equalize so that relatively little force is required to unseat the primary valve plug 36 upon subsequent continued upward movement of the control member 50'. When the pulling force of the control member 50' is released, the spring 60 returns both valve plugs 36, 52 to their seated positions.

Currently, the embodiment of FIGS. 1-9 is preferred for use in the type of system disclosed in the applicant's above-cited co-pending application. In general, the choice between the two embodiments, or between the two embodiments and other modifications of the valve of the invention, depends on the needs of the particular situation. For example, with regard to the two illustrated embodiments, the desired opening pressure differential in the check valve mode is a primary consideration in the choice between the two embodiments.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. In a check valve of a type having a housing defining an axially extending cavity divided by a valve orifice into a first portion and a second portion, first and second axially spaced ports communicating with said first and second portions of said cavity, respectively, a primary valve seat surrounding said orifice, a valve member positioned to be urged against said seat by pressure in said first port and to be moved away from said seat by pressure in said second port, and a control member positioned to engage said valve member to mechanically move said valve member away from said seat, the improvement comprising a passageway communicating with said first and second portions; a closure surface carried by said control member; and a spring normally biasing said closure surface to close said passageway; said control member being movable to pull said closure surface to open said passageway and thereby allow pressure on opposite ends of said valve member to substantially equalize, to facilitate movement of said valve member away from said seat in response to a pulling force on said valve member caused by continued movement of said control member.

2. In a check valve of a type having a housing defining an axially extending cavity divided by a valve orifice into a first portion and a second portion, first and second axially spaced ports communicating with said first and second portions of said cavity, respectively, a primary valve seat surrounding said orifice, a valve member positioned to be urged against said seat by pressure in said first port and to be moved away from said seat by pressure in said second port, and a control member positioned to engage said valve member to mechanically move said valve member away from said seat, the improvement comprising a passageway communicating said first and second portions; a closure surface carried by said control member; and a spring normally biasing said closure surface to close said passageway; said control member being movable to move said closure surface to open said passageway and thereby allow pressure on opposite ends of said valve member to substantially equalize, to facilitate movement of said valve member away from said seat in response to continued movement of said control member;

said valve further comprising a sleeve slidably received in said second portion of said cavity; said sleeve having an end opening that faces said orifice and telescopically receives an end portion of said valve member, and a pressure surface that faces away from said orifice and is in communication with said passageway when said passageway is open; and said control member engaging said sleeve to move said sleeve and said valve member as a unit.

3. In a check valve of a type having a housing defining an axially extending cavity, first and second axially spaced ports communicating with said cavity, a primary valve seat surrounding said cavity between said ports, a valve member positioned to be urged against said seat by pressure in said first port and to be moved away from said seat by pressure in said second port, and a control member positioned to engage said valve member to mechanically move said valve member away from said seat, the improvement comprising an axial passageway through said valve member, said passageway having a predetermined length and including opposite ends, and said control member extending through said passageway; a secondary valve plug; a pull block; said valve plug and said pull block being carried by said control member spaced apart a distance greater than said length, and being adjacent to said opposite ends, respectively; and a spring normally biasing said valve plug against said valve member to close said passageway; said control member being movable to move said valve plug away from said valve member to open said passageway and thereby allow pressure on opposite ends of said valve member to substantially equalize, to facilitate movement of said valve member away from said seat in response to continued movement of said control member and accompanying engagement of said valve member by said pull block.

4. The valve of claim 3, in which said seat surrounds a primary valve orifice; in which said valve member includes a primary valve plug, and a stem extending axially from said primary valve plug through said orifice and terminating in a tubular end portion distal said primary valve plug; and which further comprises a sleeve slidably received in said cavity; said sleeve having an end opening that faces said orifice and telescopically receives said end portion, and a pressure surface that faces away from said orifice and is in communication with said passageway when said passageway is open; and said pull block being positioned to engage said sleeve, upon movement of said control member, to move said sleeve and said valve member, as a unit, upon further movement of said control member.

5. The valve of claim 4, in which said sleeve further comprises an end socket directed away from said orifice and including an inner shoulder; said pull block being received in said end socket and being positioned to engage said inner shoulder.

6. The valve of claim 4, in which said end opening comprises an end socket terminating in a shoulder that engages said end portion of said stem to move said primary valve plug away from said seat in response to said further movement of said control member.

7. The valve of claim 6, in which said sleeve further comprises a second end socket directed away from said orifice and including an inner shoulder; said pull block being received in said second end socket and being positioned to engage said inner shoulder.

8. The valve of claim 4, in which said spring surrounds said control member and has a first end urged against said secondary valve plug, and an opposite end urged against a fixed support, to normally bias said secondary valve plug against said valve member to close said passageway and said valve member against said seat to close said orifice.

9. The valve of claim 8, in which said sleeve is received into said cavity with sufficient clearance to allow said spring to move said valve member to close said orifice, upon release of a pulling force on said control member and seating of said secondary valve plug against said valve member.

10. A valve, comprising:
a valve housing including an axially elongated valve cavity divided by a primary valve orifice into a first portion and a second portion;
a primary valve seat surrounding the primary valve orifice, said primary valve seat being directed toward the first portion of the valve cavity;
said second portion of the valve cavity having a closed end distal the primary valve orifice;
a tubular valve member in the housing, said valve member having a primary valve plug at one end, said primary valve plug being located in the first portion of the valve cavity and including a closure surface directed toward the valve seat, and said valve member further including a tubular stem extending axially from the primary valve plug, through the primary valve orifice, into the second portion of the valve cavity, said stem having a tubular end portion distal the primary valve plug;
said tubular valve member including a longitudinal passageway, said longitudinal passageway having a first end in the first portion of the valve cavity and an opposite second end in the second portion of the valve cavity;
said first end of the longitudinal passageway defining a secondary valve orifice;
said primary valve plug including a secondary valve seat surrounding the secondary valve orifice;
a tubular sleeve within the second portion of the valve cavity, said sleeve including a first end socket opening toward the primary valve orifice, said first end socket including a first base shoulder, said sleeve also including an oppositely directed second end socket opening toward the closed end of the second portion of the valve cavity and including a second base shoulder, and said tubular end portion of the stem of the tubular valve member being telescopically received within the first end socket;
a mechanical valve operator including an elongated axially movable control member extending axially into the valve cavity;
a secondary valve plug within the first portion of the valve cavity, connected to the control member and including a closure surface directed toward the secondary valve seat;
a pull block within the second end socket of the tubular sleeve, said pull block being connected to the elongated control member, and presenting an end directed toward the second base shoulder;
a first fluid port communicating with the first portion of the valve cavity;
a second fluid port communicating with the second portion of the valve cavity, axially between the primary valve orifice and the tubular sleeve; and a spring having a first end pressing against the secondary valve plug, and an opposite end pressing against a fixed support; said spring normally biasing the closure surface of the secondary valve plug into seated engagement with the secondary valve seat, and also normally biasing the closure surface of the primary valve plug into seated engagement with the primary valve seat;

wherein the axial spacing of said end of the pull block from the closure surface of the secondary valve plug is greater than the axial spacing of the second base shoulder from the secondary valve orifice, so that, when the closure surface of the secondary valve plug is seated or the secondary valve seat, said end of the pull block is spaced axially from the second base shoulder, and, when said end of the pull block is against the second base shoulder, the closure surface of the secondary valve plug is spaced axially from the secondary valve seat; and wherein pressure introduction through the first port into the first portion of the valve cavity, when the control member is extended to axially space said end of the pull block from the second base shoulder, and the second portion of the valve cavity is connected via the second part, to return, will result in the secondary valve plug being seated on the secondary valve seat and the primary valve plug being seated on the primary valve seat, by action of the spring and pressure forces acting on the secondary and primary valve plugs; wherein connection of the second port to pressure and the first port to return, while the control member remains extended, will result in pressure acting on the primary valve plug to move it and the secondary valve plug together, against the force of the spring, to move the primary valve plug away from the primary valve seat and open the primary valve orifice, and allow pressure to move from the second portion of the valve cavity, through the primary valve orifice to the first portion of the valve cavity, and to the first port; wherein a pull on the control member when the first portion of the valve cavity is connected to pressure and the second portion of the valve cavity is connected to return, will move the secondary valve plug away from the secondary valve seat, and allow pressure movement axially through the passageway in the tubular valve member to the closed end of the second portion of the valve cavity, with pressure in the second portion of the valve cavity, between said closed end and the tubular sleeve, exerting a pressure force on the tubular sleeve and the tubular valve member in opposition to a pressure force in the first portion of the valve cavity acting on the tubular valve member; and wherein an additional pull on the control member will move the pull block against the second base shoulder and the first base shoulder against said tubular end portion of the stem, and move the tubular sleeve and the tubular valve member together against the force of the spring, to move the primary valve plug away from the primary valve seat and open the primary valve orifice and allow pressure movement from the first portion of the valve cavity, through the primary valve orifice, and through the second portion of the valve cavity to the second port.

* * * * *

UNITED STATES PATENT AND TRADEMARK OFFICE
CERTIFICATE OF CORRECTION

PATENT NO.   : 5,255,712
DATED        : October 26, 1993
INVENTOR(S)  : Raymond Keith Foster It is certified that error appears in the above-identified patent and that said Letters Patent is hereby corrected as shown below:

Column 4, line 20, "olean" should be -- clean --.
Column 7, line 31, "6" should be -- 6' --.
Column 7, line 35, "member '" should be -- member 50' --.
Column 7, line 39, "pull block" should be -- pull block 78 --.
Claim 1, column 8, lines 37 and 38, after "communicating",
    delete "with".
Claim 10, column 11, line 14, "or" should be -- on --.
Claim 10, column 11, line 25, "part" should be -- port --.

Signed and Sealed this

Twentieth Day of September, 1994

Attest:

BRUCE LEHMAN

Attesting Officer    Commissioner of Patents and Trademarks